April 8, 1924.

P. J. MASON

CREAM COOLER

Filed Aug. 31. 1922

1,489,956

2 Sheets-Sheet 1

Inventor
P. J. Mason.

April 8, 1924.

P. J. MASON

CREAM COOLER

Filed Aug. 31, 1922

1,489,956

2 Sheets—Sheet 2

Inventor
P. J. Mason
By [signature]
Attorney

Patented Apr. 8, 1924.

1,489,956

UNITED STATES PATENT OFFICE.

PEARL J. MASON, OF ONTARIO, WISCONSIN.

CREAM COOLER.

Application filed August 31, 1922. Serial No. 585,411.

*To all whom it may concern:*

Be it known that I, PEARL J. MASON, a citizen of the United States, residing at Ontario, in the county of Vernon and State of Wisconsin, have invented certain new and useful Improvements in Cream Coolers; and I do hereby declare the following to be a full, clear, and exact description of the invention, such as will enable others skilled in the art to which it appertains to make and use the same.

In the dairy business it is essential that all the animal heat be eliminated from cream and milk to prevent rapid deterioration thereof by becoming sour.

The present invention provides a mechanism for agitating the cream or milk, whereby to eliminate the animal heat without churning the same or breaking up the butter containing cysts.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1:
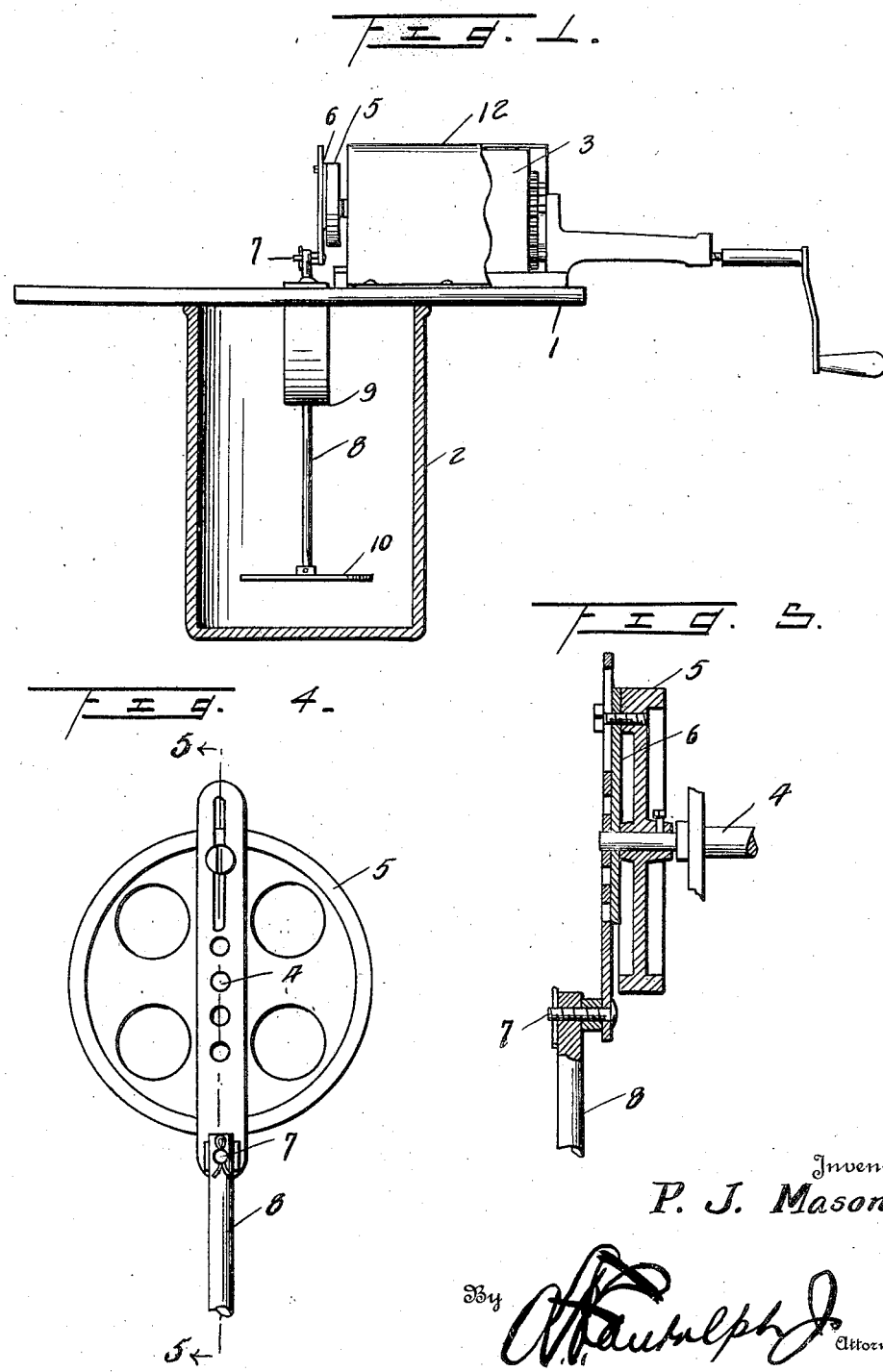
Figure 2:
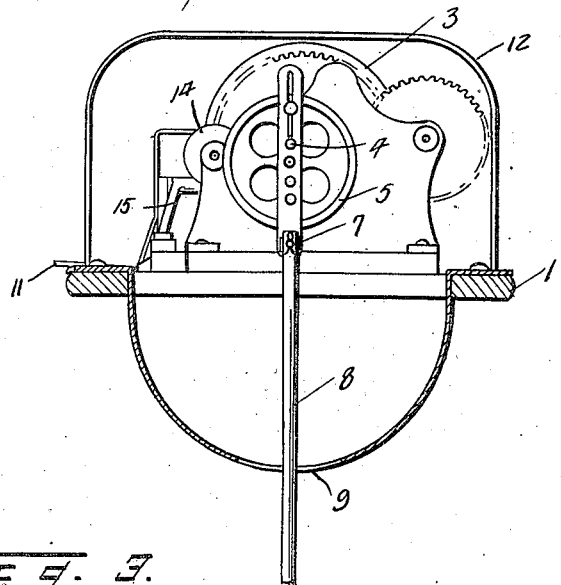
Figure 3:
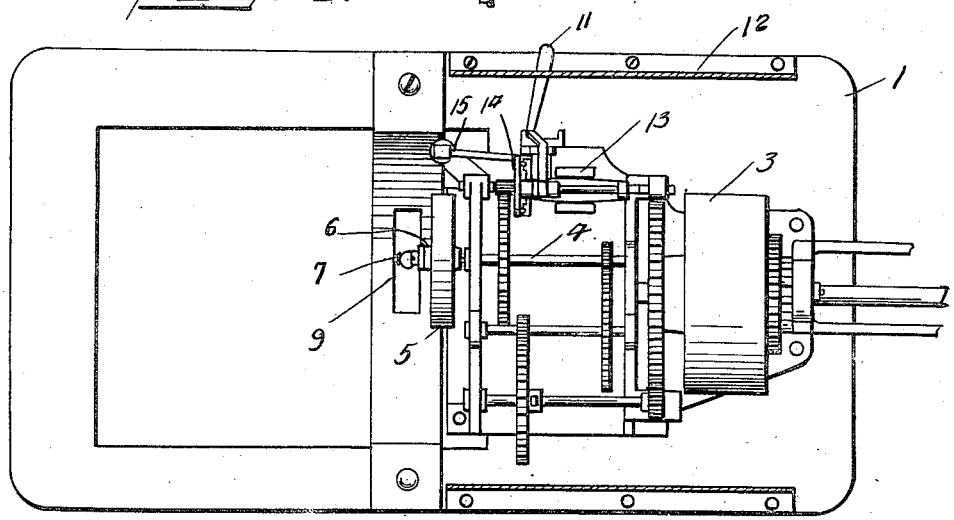

Referring to the accompanying drawings forming a part of the application,

Figure 1 is a side view of a cream or milk cooling mechanism embodying the invention, Figure 2 is a transverse section, Figure 3 is a top plan view, the housing being in section, Figure 4 is a front view of the pulley applied to the drive shaft showing the means for adjustably connecting the dasher shaft thereto, and Figure 5 is a section on the line 5—5 of Figure 4.

Corresponding and like parts are referred to in the following description and designated in the several views of the drawings by like reference characters.

The numeral 1 designates a base which forms a support for the operating parts and which is adapted to be placed upon a container 2 holding the cream or milk to be agitated in the process of eliminating the animal heat. A spring motor 3 of any type, make or design is mounted upon the base 1 and its drive shaft 4 is connected by a suitable train of gearing with the spring driven shaft and power is taken therefrom for operating the dasher by means of which the cream or milk is agitated. A pulley 5 is fast to the drive shaft 4 and a bar 6 secured to the pulley 5 and drive shaft 4 has a wrist pin 7 adjustably connected thereto, whereby to regulate the throw of the dasher. The dasher shaft 8 is connected to the wrist pin 7 and passes through an opening in a guide 9 and its lower end is provided with a dasher 10 of any preferred construction. When the motor is in operation, the dasher 10 is reciprocated and may operate to agitate the cream or milk placed in the container 2.

In the operation of the invention, the cream or milk to be cooled is placed in the container 2 and the base 1 is positioned to rest upon the container 2, and when the motor is in operation, the dasher 10 is reciprocated and agitating the cream or milk in the container 2 eliminates the animal heat therefrom.

It is observed that the motor is adapted to be controlled in its starting and stopping by means of a lever 11 which is conveniently positioned and extends through an opening in a side of the housing 12 which encloses and protects the drive gearing. The speed of the motor is adapted to be regulated by means of a governor 13, such as usually provided in motors designed for operating light mechanism, and which in the present instance includes a brake disk 14 and an adjustable brake lever 15, which may be set according to the desired speed.

What is claimed is:

A unitary milk and cream cooler having a base substantially solid for approximately one half of its length, the remainder of the base being of U-shape and surrounding a relatively large opening therethrough, a guide member spanning said opening secured to the U-shaped portion on opposite sides of the opening, said guide member being depressed to a substantial extent below the opening, a motor disposed on the solid portion of the base having a horizontal shaft, a vertically disposed pulley on said shaft arranged substantially over the guide member, a bar adjustably mounted on the outer surface and diametrically of said pulley, and a dasher shaft pivoted to said bar and slidable centrally of and through said guide.

In testimony whereof I affix my signature in presence of two witnesses.

PEARL J. MASON.

Witnesses:
C. M. LOWER,
IVA M. CHANDLER.